(12) United States Patent
Rohde (10) Patent No.: US 8,489,992 B2
(45) Date of Patent: Jul. 16, 2013

(54) USER INTERFACE WITH VISUAL PROGRESSION

(75) Inventor: Ruben Rohde, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 1265 days.

(21) Appl. No.: 12/099,635

(22) Filed: Apr. 8, 2008

(65) Prior Publication Data

US 2009/0254829 A1 Oct. 8, 2009

(51) Int. Cl.
*G06F 3/16* (2006.01)

(52) U.S. Cl.
USPC .......................................................... 715/728

(58) Field of Classification Search
USPC ................... 715/727, 738, 729, 833, 786, 78, 715/728
See application file for complete search history.

(56) References Cited

U.S. PATENT DOCUMENTS

| | | | |
|---|---|---|---|
| 5,838,320 A * | 11/1998 | Matthews, III et al. | 715/786 |
| 6,185,527 B1 | 2/2001 | Petkovic et al. | |
| 7,479,949 B2 * | 1/2009 | Jobs et al. | 345/173 |
| 7,532,913 B2 | 5/2009 | Doulton | |
| 2003/0128820 A1 | 7/2003 | Hirschberg et al. | |
| 2006/0010217 A1 | 1/2006 | Sood | |
| 2007/0293272 A1 | 12/2007 | Salmon | |
| 2008/0031595 A1 | 2/2008 | Cho | |
| 2008/0055264 A1 | 3/2008 | Anzures et al. | |
| 2008/0207176 A1 | 8/2008 | Brackbill et al. | |
| 2009/0177301 A1 * | 7/2009 | Hayes | 700/94 |

FOREIGN PATENT DOCUMENTS

| | | |
|---|---|---|
| EP | 1 109 390 A2 | 6/2001 |
| EP | 1 345 394 A1 | 9/2003 |
| WO | WO 2004/095422 A2 | 11/2004 |
| WO | WO 2007/002753 A2 | 1/2007 |

OTHER PUBLICATIONS

International Search Report for corresponding case PCT/US2009/039634 dated Jul. 17, 2009.
"One Voicemail Box—All your messages in one place", GrandCentral from Google, http://grandcentral.com/home/one_voicemail, printed Apr. 8, 2008.
"GoogleTube Video of the Day", Google, http://gvod.blogspot.com/, printed Apr. 8, 2008.
"Mac OS X Tips—Tips and Tricks for the Mac OS", Safari Mac OSX, Oct. 16, 2007, http://www.macosxtips.co.uk/index_files/tips-for-safari-3.html.
"The world's best browser. Now on Windows, too", Safari 3, http://www.apple.com/safari/, printed Apr. 8, 2008.
"Voicemail users are drowning in data every day. How can they manage their important messages better?", SCANMAIL, p. 1 of 1, http://avatarweb.com/scanmail/, printed Apr. 8, 2008.

(Continued)

*Primary Examiner* — Thanh Vu (74) *Attorney, Agent, or Firm* — Brinker Hofer Gilson & Lione (57) ABSTRACT

In one embodiment, a graphics user interface is provided. The graphics user interface includes a plurality of graphical representations identifying separate audio data, respectively. Each of the plurality of graphical representations is configured in a list to be selected for playback of the respective audio data. A progression icon is displayed in each of the respective graphical representations. Each progression icon illustrates a temporal progression of the playback of the respective audio data.

19 Claims, 5 Drawing Sheets

OTHER PUBLICATIONS

Calore, "Voicemail-as-Text Service Quiets the Ringing in your Ears," WIRED Jun. 25, 2007, http://www.wired.com/print/software/webservices/news/2007/06/callwave.

"Automatic summarization," Wikipedia, Mar. 1, 2008, http://en.wikipedia.org/wiki/Automatic_summarization.

International Search Report for corresponding case PCT/US2009/038936 dated Jul. 15, 2009.

Written Opinion of the International Searching Authority for corresponding case PCT/US2009/038936 dated Jul. 15, 2009.

Whittaker et al., "SCANMail: A Voicemail Interface that Makes Speech Browsable, Readable and Searchable," Apr. 20, 2002, CHI 2002 Conference Proceedings, Conference on Human Factors in Computer Systems, Minneapolis, MN Apr. 20-25, 2002, vol. No. 4, Issue No. 1, pp. 275-282.

* cited by examiner

USER INTERFACE WITH VISUAL PROGRESSION

BACKGROUND

The present disclosure relates generally to data communication and user interfaces.

Communication takes many forms. For example, ideas, feelings, and questions are many times conveyed using the spoken word. Using technology, the spoken word can be captured, stored, and transmitted to several potential listeners. Music, voice messages, such as voicemails, and other speech based content are becoming a significant part of society. Users and listeners can use devices, such as computers, telephones, or personal digital assistants ("PDAs"), to listen to a variety of information at desired times. However, as more and more audio content is acquired, users are seeking to review and/or listen to the audio content in more efficient and comfortable manners.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

By way of introduction, the example embodiments described below include a graphics user interface and associated methods. For example, the graphics user interface includes one or more icons identifying respective audio files or data, such as voice messages. Progression of playback of the audio file or data is displayed within each of the respective icons.

According to a first aspect, a graphics user interface is provided. The graphics user interface includes a plurality of graphical representations identifying separate audio data, respectively. Each of the plurality of graphical representations is configured in a list to be selected for playback of the respective audio data. A progression icon is displayed in each of the respective graphical representations. Each progression icon illustrates a temporal progression of the playback of the respective audio data.

According to a second aspect, a data signal is received. The data signal is stored as an audio file. An image object identifying the audio file is generated. A progression icon to be displayed in the image object is generated. The progression icon extends over an entire height of the image object. Movement of the progression icon during playback of the audio file corresponds to temporal progression of the audio file.

According to a third aspect, a first graphical icon is displayed. A second graphical icon is displayed simultaneously with the first graphical icon. The first graphical icon and the second graphical icon represent separate voice messages, respectively. A progression image object is displayed in each of the first and second graphical icons. Selection of the first graphical icon is received for playback of the respective voice message. The location of the respective progression image object illustrates a temporal position of a current audio playback in the selected voice message.

The present invention is defined by the following claims, and nothing in this section should be taken as a limitation on those claims. Further aspects and advantages of the invention are discussed below in conjunction with the preferred embodiments.

Example Embodiments

A list of graphical representations of voice messages, such as visual voicemails, or other audio files or data is displayed. For example, each audio file or voice message is associated with a visual progression bar. A user can see all of the voice message or audio file icons with their respective progression bars. The user can playback audio and/or a voice message from the list, and during playback, the respective progression bar indicates the timing or temporal progression of the playback of the voice message and/or audio file. The user can stop the audio file or voice message, and the progression bar will remain or rest at or indicate the point in time where the audio file or voice message was stopped. This way, a user can go to any part of an audio file or voice message without listening to the entire message or repeated portions.

Figure 1:
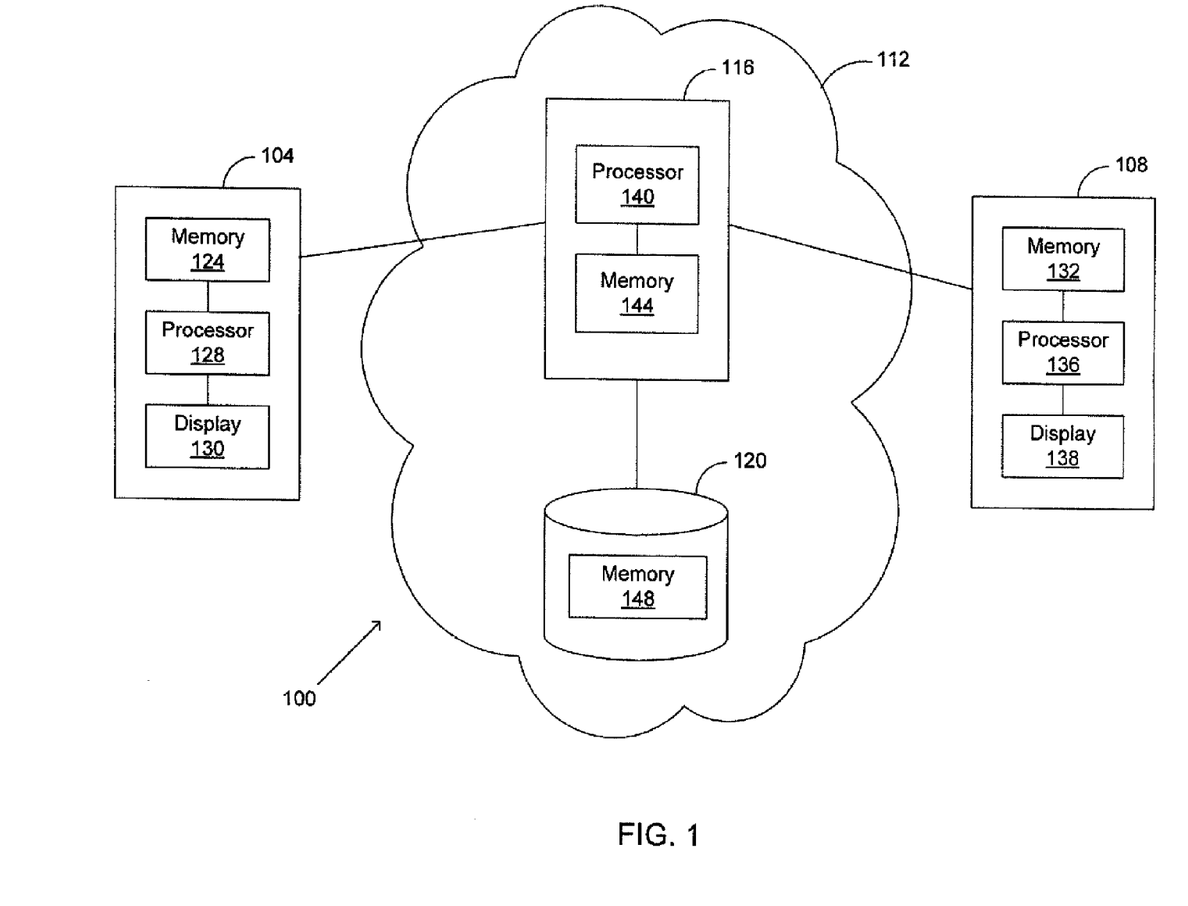
FIG. 1 illustrates one embodiment of a data communication system.

FIG. 1 shows a data communication system 100 (hereinafter referred to as "system 100"). The system 100 is an Internet protocol-based system, an Intranet system, a telephony system, a voice over Internet protocol ("VoIP") system, a cellular based system, a message system, a wireless or wired audio/visual data communication system, and/or any known or future data communication system.

The system 100 includes, but is not limited to, a user or client device 104, a network 112, and another user or client device 108. The network 112 includes a server 116 and a repository or database 120. Additional, different, or fewer devices or components may be provided. For example, a proxy server, a billing server, a name server, a switch or intelligent switch, other computers or workstations, administrative components, such as an administrative workstation, a gateway device, a backbone, ports, network connections, and network interfaces may be provided. While the components in FIG. 1 are shown as separate from one another, one or more of these components may be combined.

The user device 104 is a wireless device (e.g., a cellular phone, a PDA, a wireless computer), a wired or cabled device (e.g., a desktop computer using a broadband cable or digital subscriber line ("DSL") connection), a landline based or VoIP telephone, or any other data communication device that can transmit or convey aural content, speech, or voice messages. A user uses the device 104 to initiate and/or conduct voice or speech conversations as well as leave voice messages, such as voicemails, with an intended recipient. For example, the user device 104 communicates with the user device 108 or the server 116 associated with the user device 108 via the network 112.

The user device 104 includes a memory 124, a processor 128, and a display 130. Additional, different, or fewer components may be provided. For example, an input device is provided, such as a button, keypad, keyboard, mouse, trackball, rocker switch, touch pad, or voice recognition circuit. Audio components may be provided. For example, a speaker, one or more microphones, an antenna, a transceiver, audio jacks, and/or other components for outputting or receiving audible or sound signals may be provided. Alternatively, the audio components may be part of a separate device or are separate devices that may be placed in communication with the user device 104.

The processor 128 is in communication with the display 130 and the memory 124. The processor 128 may be in communication with more or fewer components. The processor 128 is a general processor, application-specific integrated circuit ("ASIC"), digital signal processor, field programmable gate array ("FPGA"), digital circuit, analog circuit, or combinations thereof. The processor 128 is one or more processors operable to control and/or communicate with the various electronics and logic of the user device 104. The processor 128, the memory 124, and other circuitry may be part of an integrated circuit.

The processor 128 is operable to generate voice or speech data. For example, analog aural or speech signals are received and processed into digital signals. The digital signals include one or more packets of data corresponding to speech components. Alternatively, the processor 128 may generate data packets that are to be converted into audio signals without receiving any input speech signals, such as a computer based voice message. Also, the processor in combination with a transmitter may generate radio frequency ("RF") signals to transmit speech or voice content. In alternative embodiments, the server 116 or other device generates the voice or speech data from stored data or received in an analog format.

The display 130 is any mechanical and/or electronic display positioned for accessible viewing in on, or in communication with the user device 104. For example, the display 130 is a touch screen, liquid crystal display ("LCD") cathode ray tube ("CRT") display, or a plasma display. The display 130 is operable to display graphical representations of voicemails, emails, websites, and other data or media.

The memory 124 is any known or future storage device. The memory 124 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 124 may be part of the processor 128.

In an alternate embodiment, the user device 104 is a workstation, computer, database, or other device used to store and/or modify a variety of audio files or data. For example, the user device 104 is configured to store, modify, download, upload, and/or transmit music files, such as MPEG audio layer 3 ("MP3") files, speech data, communication files, and/or other audio data or files.

The user device 104 is operable to communicate with the user device 108 via the network 112. The network 112 is the Internet, a cellular network, an intranet, a local area network ("LAN"), a wide area network ("WAN"), a virtual private network ("VPN"), a message network, a music file sharing network, a VoIP network, a telephone network, and/or any known or future network. The network may contain cellular base stations, servers, computers, or other systems, devices, or components for transferring and/or modifying data. The server 116 and the database 120 are shown to be within the network 112. However, the server 116 and/or database 120 may be outside the network 112 or may be part of a separate network.

The server 116 communicates with the user device 104, the user device 108, and the database 120. The sever 116 is a provider server, an application server, communications server, database server, proxy server, file server, web server, client server, peer-to-peer server, and/or any known or future server. For example, the server 116 is a network access server, a gateway general packet radio service ("GPRS") support node, and/or an authentication, authorization, and accounting ("AAA") server. The server 116 is operable to receive voice, speech, music, and/or audio data from the user device 104 and 108. The server 116 is a software and/or hardware implementation. For example, the server 116 is an application program. Alternatively, the server 116 is a server computer or any other hardware that executes and runs server applications.

A hardware implementation of the server 116 includes, but is not limited to, a memory 144 and a processor 140. Additional, different, or fewer components may be provided. The processor 140 is in communication with the memory 144. The processor 140 may be in communication with more or fewer components. The memory 144 and the processor 140 are similar to or different than the memory 124 and the processor 128, respectively. The processor 140 analyzes and/or modifies the voice, speech, music, and/or audio data and passes or transmits the data to the user device 108. The processor 140 may also store or save the voice, speech, or music data as a voice message or other audio file in the memory 144 or the database 120.

For example, the server 116 may generate and store voice messages or voicemails as well as store audio files, such as music files. The server 116 is also configured to generate graphical data that represents or identifies the voice messages, music files, or other audio data. For example, the processor 140 generates icons, image objects, or graphical representations of the audio data or files. The processor 140 also generates a progression icon or image object, such as a visual progression bar, that is displayed in the respective icons identifying the audio files and/or voice messages. The progression icons illustrate or show temporal progression of the audio file during playback.

The server 116 is further operable to convert the voice or speech data into textual or word data. For example, the processor 140 or other component, such as a converter, identifies speech content and associates words or phrases with the speech content to generate text corresponding to a voice message. The server 116 generates a summary or textual summary of the voice message. For example, the summary includes a gist of the voice message. The summary provides more than just a name, date, time, or number. For example, the summary may provide a central or main point, idea, or communication that is to be conveyed by the voice message. The summary may be displayed with a respective icon identifying a voice message or visual voicemail. For example, the methods and features of U.S. patent application Ser. No. 12/099, 641 entitled "USER INTERFACE WITH VOICE MESSAGE SUMMARY" may be used.

The functionality of the server 116 may be implemented on a different or separate device. For example, a gateway device, a switch, an intelligent switch, a router, or other device may be used to execute the tasks of the server 116.

The database 120 is in communication with the server 116. The database 120 is a central repository, a cache network, distributed database of a plurality of databases, or any known or future data storage device or system. The database 120 includes a memory 148. Additional, different, or fewer components may be provided. For example, one or more processors may be provided. The memory 148 is similar to or different than the memory 144 and/or 124.

The database 120 receives and stores data, such as voice message data, music files, or other audio data. For example, when a first user attempts to call or have a conversation with a second user (e.g., the user device 104 attempts to transmit voice data to the user device 108 via the server 116), the first user may have to leave a voice message or voicemail if the second user is not available. In such a case, the server 116 generates a voice message from the voice data received and stores the voice message in the memory 144 and/or the database 120 (via the memory 148). The storage of the voice message in the memory 144 may be relatively temporary compared to the storage in the database 120. The database 120 may partition voice messages based on different users, locations, timings, or other factors. Alternatively, the database 120 may also store the progression information corresponding to the respective voice messages.

Stored voice messages may be retrieved from the database 120 or the server 116 by a user (e.g., via the user device 108) to listen to the respective voice message and/or to prepare a summary. The database 120 may be integrated into the server 116. Alternatively, the server 116 may transmit the voice message to the user device 108 upon creation of the voice message to be stored on the user device 108.

Alternatively, the database 120 contains a plurality of music files or audio data that can be downloaded or uploaded for listening purposes. For example, a user using either the user device 104 or 108 may desire to listen to a new or old song or other music file. The user downloads a song via the server 116 to listen to using the user device 104 or 108. The database 120 may also contain or store the graphical representations of the voice messages and/or audio files as well as the respective progression icons.

The user device 108 is similar to or different than the user device 104. The user device 108 includes a memory 132, a processor 136, and a display 138. Additional, different, or fewer components may be provided such as described in regards to the user device 108. The memory 132, the processor 136, and the display 138 are similar to or different than the memory 124, the processor 128, and the display 130, respectively. The user device 108 is used to view graphical representations or icons representing voice messages, such as visual voicemails, music or song files, or other audio data and is used to playback the audio data or files. The user device 108 also displays visual progression, such as progression icons, image objects, or bars, within each of the graphical representations identifying the voice messages, music files, and/or other audio files. The user device 108 may also perform the functionalities of the user device 104 and vice versa.

Figure 2:
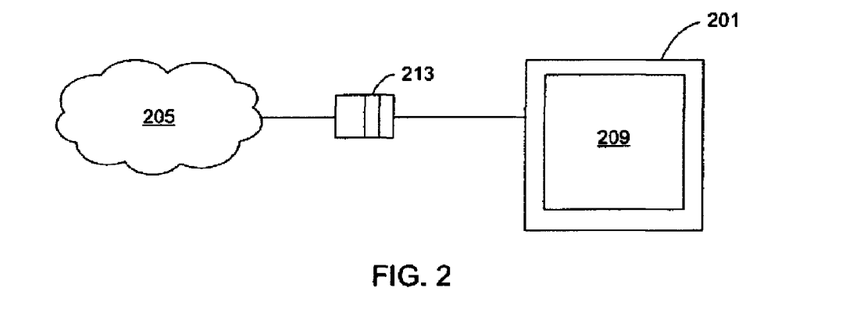
FIG. 2 illustrates an embodiment of a user device in communication with a network of a system, such as the system of FIG. 1.

FIG. 2 shows a user device 201 in communication with a network 205, such as the network 112. The user device 201 is similar to the user device 108 and/or the user device 104. For example, the user device 201 is a cellular telephone, a digital telephone, a computer, or a PDA. The user device 201 includes a screen or display 209, such as the display 130 and/or 138. The screen 209 is used to view graphical representations of voice messages, visual voicemails, music or song files, or other audio data.

The user device 201 communicates with the network 205. For example, when a server or device in the network 205 generates a voice message, the network 205 sends or transmits data 213, such as one or more data packets, to the user device 201. Or, when a music selection, song, or other audio file is being downloaded or acquired, the network 205 sends or transmits data 213, such as one or more data packets, to the user device 201. The data 213 is used to make the user device 201 aware of a voice message or is used to display a representation of a music file and/or audio file. For example, the data 213 is received by the user device 201, and based on the data 213, a graphical representation, image object, or icon identifying the voice message, song, and/or audio file is generated or displayed on the user device 201. The graphical data, including progression icon information, that is to be displayed may be part of the data 213 or may be generated in the user device 201. The progression image data may be transmitted to the user device 201 separate from the data 213.

Alternatively, the data 213 may be or include the voice message, music, and/or audio content that is to be played back via the user device 201. For example, if a user selects the graphical representation, image object, or icon identifying or representing a certain voice message, song, or other audio data, the user device may send a request to the network 205 (e.g., a server or database in the network 205) to obtain or retrieve the audio content, and the network transmits the audio content to the user device, such as via the data 213. Or, the voice message, music, or other audio content may be stored on the user device 201. The progression image data, such as the progression icon or bar data, may also be generated in the user device 201 rather than in a server or other network device.

Figure 3:
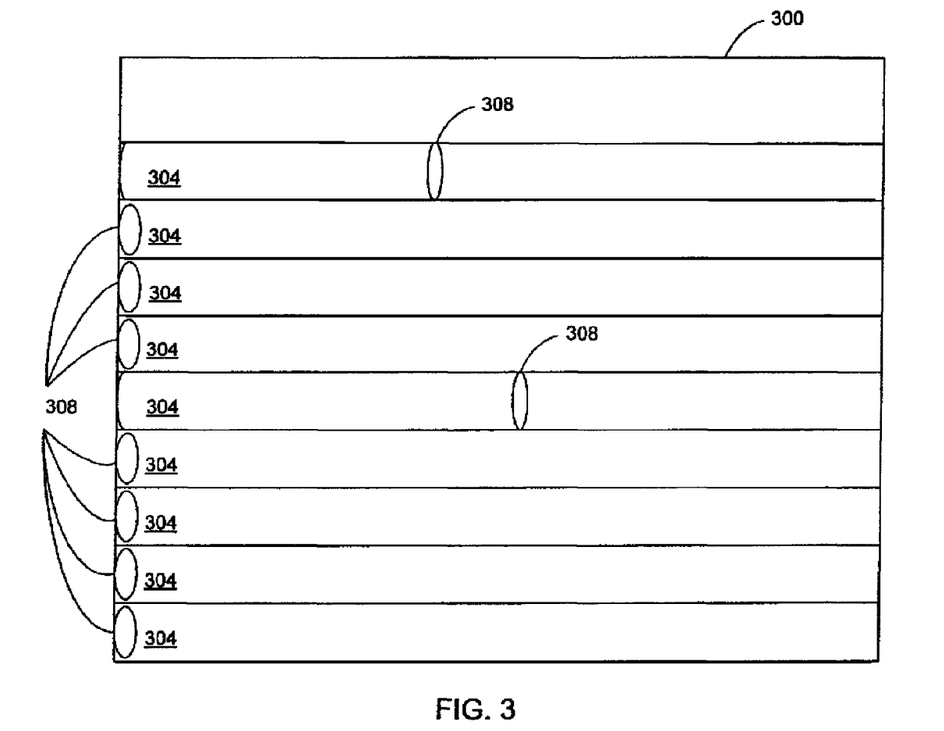
FIG. 3 illustrates an embodiment of a graphics user interface of a user device, such as the user device of FIG. 2.

FIG. 3 shows a graphics user interface 300 of a user device, such as the user device 104, 108, and/or 201. The graphics user interface 300 is executed on a display, such as the display 130, 138, and/or 209. The graphics user interface 300 includes one or more graphical representations, image objects, or icons 304 identifying respective voice messages, such as voicemails, music or song files, or other audio data. A progression icon or image object 308 is displayed with a respective icon 304. Additional, fewer, or different features may be displayed. For example, time data, personal information of a caller, caller identification, date data, subject data, song title data, audio file information, voice summary information, activation buttons or icons, or other content may also be displayed with the icons 304.

For example, a list of graphical representations 304 is displayed in the graphics user interface 300. The graphical representations 304 correspond to and identify separate voice messages or visual voicemails ready to be selected for playback by a user. The graphical representations 304 are contained within a same screen shot or window. For example, the list of icons 304 is displayed within a voicemail inbox screen or equivalent screen for a user to view his or her voicemail messages. Alternatively, multiple screens or windows may be used for displaying different icons 304. For example, deleted icons 304 or icons 304 related to voicemails that have been listened to may be listed in a first window or screen shot, and saved icons 304 or icons 304 related to voicemails that have not been listened may be listed in a second window or screen shot.

In an alternate embodiment, the list of graphical representations 304 corresponds to a list of different songs, music files, or other audio files. For example, a list of different song icons is shown in a same screen shot for a user to scroll through and select a desired song to listen to.

The image objects 304 have a substantially rectangular shape. Alternatively, the image objects 304 may have a substantially oval, circular, or other geometrical shape. In other alternatives, no shape is provided, such as where the objects 304 are merely listed. The image objects 304 may be represented in a two dimensional or three dimensional perspective. Also, the image objects 304 may be illustrated with the same or similar color or shading or may be illustrated with a variety of or different colors or shadings.

The image objects 304 are listed in chronological order. For example, the most recent image object 304 may be listed at the top or beginning of the list. Alternatively, the image objects 304 may be listed based on the respective subjects, categories, or other user preferences (e.g., configure the list by sender, title, or musical group). Listing of the icons 304 may take a variety of forms. For example, the graphics user interface 300 may list the icons 304 in a vertical, horizontal, circular, or other geometrical pattern. A user may scroll up or down to view all the icons 304 within a respective screen or window.

The progression icon 308 illustrates a temporal progression of the playback of the respective audio data. For example, the progression icon 308 is a visual or graphic bar that is configured to move across or over a respective icon or image object 304. The progression icon 308 may or may not be an interactive icon. The movement of the progression icon 308 during playback of the audio file corresponds to temporal progression of the audio file. For example, if a user selects one image object 304 to listen to, the respective progression icon 308 begins to move across the image object 304, identifying the current temporal location, point in time, or relative time to the overall length of the audio playback. The portion or portions of the image object 304 that have been passed by the progression icon 308 change color or shade relative to portions of the image object that have not been passed by or over by the progression icon 308.

The progression icon 308 for each image object 304 is always visually present or may appear when playback has been initiated. The progression icon 308 may also be visually present in the respective image object 304 when playback is stopped to mark the temporal location of the stopped or paused audio file. However, if a user moves or configures the progression icon 308 back to an origin state (e.g., the beginning or the audio file), then the progression icon 308 may disappear and reappear during initiation or activation of the audio playback.

The progression icons 308 have a substantially oval shape. The progression icons 308 may be transparent or may be opaque. Alternatively, the progression icons 308 may have a substantially rectangular, circular, triangular, or other geometrical shape. Or, the progression icons 308 may be a dividing line having a small or no width that illustrate progression via color, shade, other visual change.

The progression icons 308 are displayed in, on, or over each of the respective icons 304. Multiple progression icons 308 may be displayed at the same time in the same list, screen, and/or window. For example, the progression icons 308 are in or within the respective visual borders of the graphical representations 304. The progression icons 308 may extend across or over an entire height of each image object 304, respectively. For example, the progression icons 308 may cover the area between a lower border limit and an upper border limit of the respective image objects 304. The progression icons 308 may also extend beyond the borders, such as the lower and upper borders, of the respective image objects 304.

Figure 4:
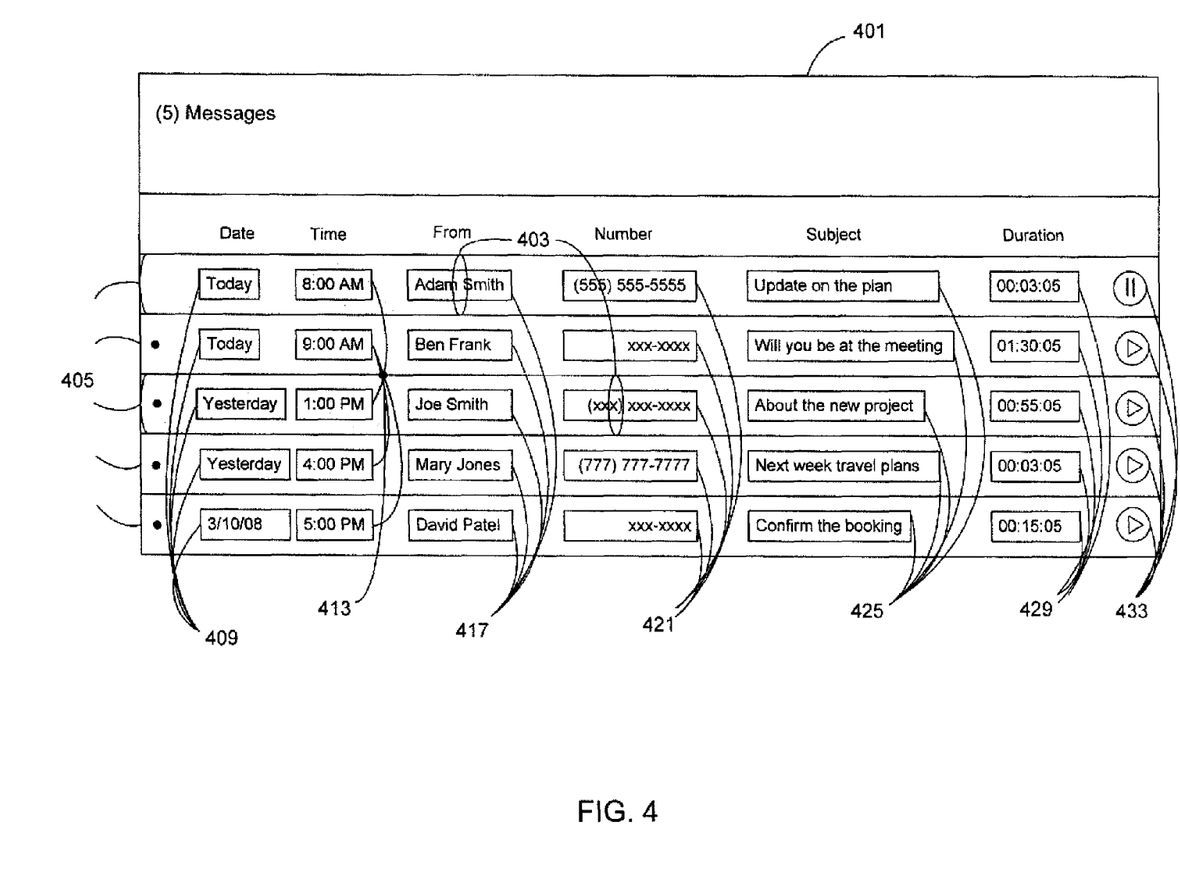
FIG. 4 illustrates an alternate embodiment of a graphics user interface of a user device, such as the user device of FIG. 2.

FIG. 4 shows a graphics user interface 401 of a user device, such as the user device 104, 108, and/or 201. The graphics user interface 401 may be similar to or different than the graphics user interface 300. The graphics user interface 401 includes or displays date information 409, time information 413, sender information 417, phone number information 421, subject information 425, and duration information 429 for each listed voice message icon 405. The icons 405 are similar to or different than the icons 304. Also, progression icons or image objects 403, such as the icons 308, are provided. The progression icons 403 are illustrated as transparent, but they may be provided as opaque objects. The number of messages and/or audio files and activation icons or soft buttons 433 are also provided. FIG. 4 illustrates a list of visual voicemails, but other audio files or data may be illustrated instead or in addition. For example, one or more song, music, or audio file icons may be provided in which the subject information 425 includes title, musical group, name, subject, or other information.

In regards to describing FIG. 4 in terms of visual voicemails or voice messages, the date information 409 and the time information 413 represents when a user received the respective voice message. The date and time information may be configured to user preferences, such as representing the date in a United States or European fashion. The sender information 417 identifies the person who left the voice message. For example, a full or partial name may be displayed. The name may be extracted from the voice message itself or may be identified through a network database, caller identification, or a memory network. Entity or company names may be used instead of personal names. The phone number information 421 corresponds to the phone number or Internet protocol address of the sender of the voice message. The phone number information 412 may or may not include area code information or foreign numbers. The phone number information 412 may also be extracted from the voice message or caller identification. For example, a person leaving the voice message may say or speak the number he of she is calling from or a contact number, and that number may be extracted from the voice message.

The subject information 425 includes textual summaries or summaries, such as the summaries 308, of respective voice messages. One or more words or a phrase summarizing or providing a gist of the voice message is displayed. The gist or summary may be more than a number, name, date, or time associated with the voice message. For example, the gist or summary may provide the essence or central message or communication (e.g., material or significant words) that is to be conveyed by the voice message. Examples of summaries include: "Will you be at the meeting," "About the new project," "Update on the plan," Next week travel plans," and "Confirm the booking."

The duration information 429 represents how long the voice message is temporally. A user may view the duration information 429 to determine which voice message will be quicker or faster to review. Alternatively, the duration information 429 corresponds to the length of a song, musical selection, or other audio file. Also, the duration information 429 may illustrate the change in time as audio content is played back instead of being a constant indicator of the entire length of the audio content. Or, a separate counter icon, such as a playback time associated with the progression icon 403, may be provided.

The activation button 433 is an icon or soft button to select, activate, or initiate a respective voice message, song, or other audio file. By selecting the activation button 433, a user may listen to the respective audio content or data via an audio output on the user device or in communication with the user device. The activation button 433 may be used to stop or pause playback of the audio content as well. Other activation may be used, such as "clicking" on the icon 405 for a given audio file.

The progression icons 403 are used to view a temporal progression of playback of the respective audio content. The progression icons 403 are within each respective image object 405 and may extend an entire height of the respective image object 405. The progression icons 403 can be moved to a desired point in time across the respective image objects 405 (e.g., independent of playback, a user may move a progression icon 403 to a desired temporal location). Progression icons 403 may not be visually present until initiation of playback or until a user designates, via playback or user control, a progression icon 403 to be at a temporal location above an origin point or zero time. For example, regarding an image object 405 that does not display a progression icon 403 initially (e.g., playback has not been selected), a user can select the image object 405, such as by clicking on it or placing a mouse or stylist pen on the image object 405, in which a progression icon 403 may appear and may be dragged to a desired temporal location.

A user can listen to a portion of audio content for one file or message, listen to another message or file, and then come back to the original message or file to finish playback from where, temporally, the audio content was stopped or paused. Therefore, a user can conveniently and comfortably listen to a variety of messages and/or audio files displayed within a same screen or window and view temporal progression or location of each audio file without opening or viewing another window or screen shot.

Figure 5:
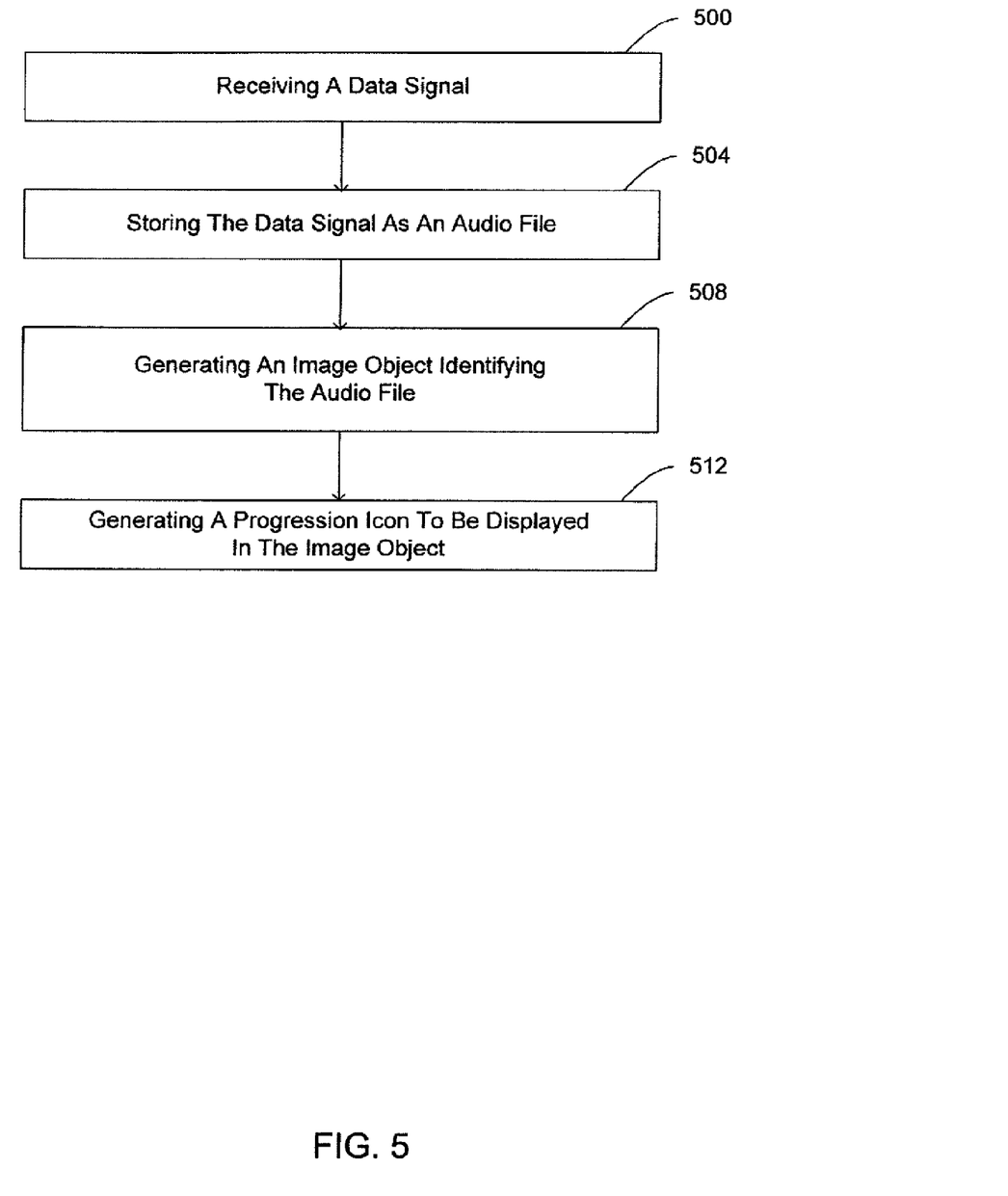
FIG. 5 illustrates one embodiment of a method for generating data for a graphics user interface, such as the graphics user interface of FIG. 3 and/or FIG. 4.

FIG. 5 shows a method for generating data for a graphics user interface, such as the graphics user interface 300 and/or 401. Fewer or more acts may be provided. In act 500, a data signal is received. The data signal may be a voice signal, such as speech data, music data, or other audio data. For example, a first user initiates a call to a second user via a phone, computer, or PDA. The second user is unavailable, and, therefore, the first user leaves a voice message for the second user. Speech content from the first user is converted into voice data or signals. Voice data, such as data packets, or voice signals are transmitted to a network, such as the network 112 or 205. A server or basestation, such as the server 116, or a user device receives the voice data or signal. Alternatively, a music, song, or other audio signal is received by the sever or basestation.

In act 504, the data signal is stored or saved as a voice message, such as a voicemail, music or song file, or other audio file. For example, the server stores the voice message and/or audio file in a repository or database, such as the database 120. In act 508, an image object, such as the image object 305 or 405, identifying the audio file is generated, such as by the server. The image object may also be stored in the database. The image object is transmitted to a respective user device, such as the user device 104, 108, or 201, or user interface for display. Alternatively, the image object is generated in the user device.

In act 512, a progression icon, such as the progression icon 308 or 403, is generated, such as by the server, to be displayed in the image object. Alternatively, the progression icon is generated in the user device. Also, audio content and/or other features of the graphics user interface may be transmitted to the user device or may be generated by the user device.

Figure 6:
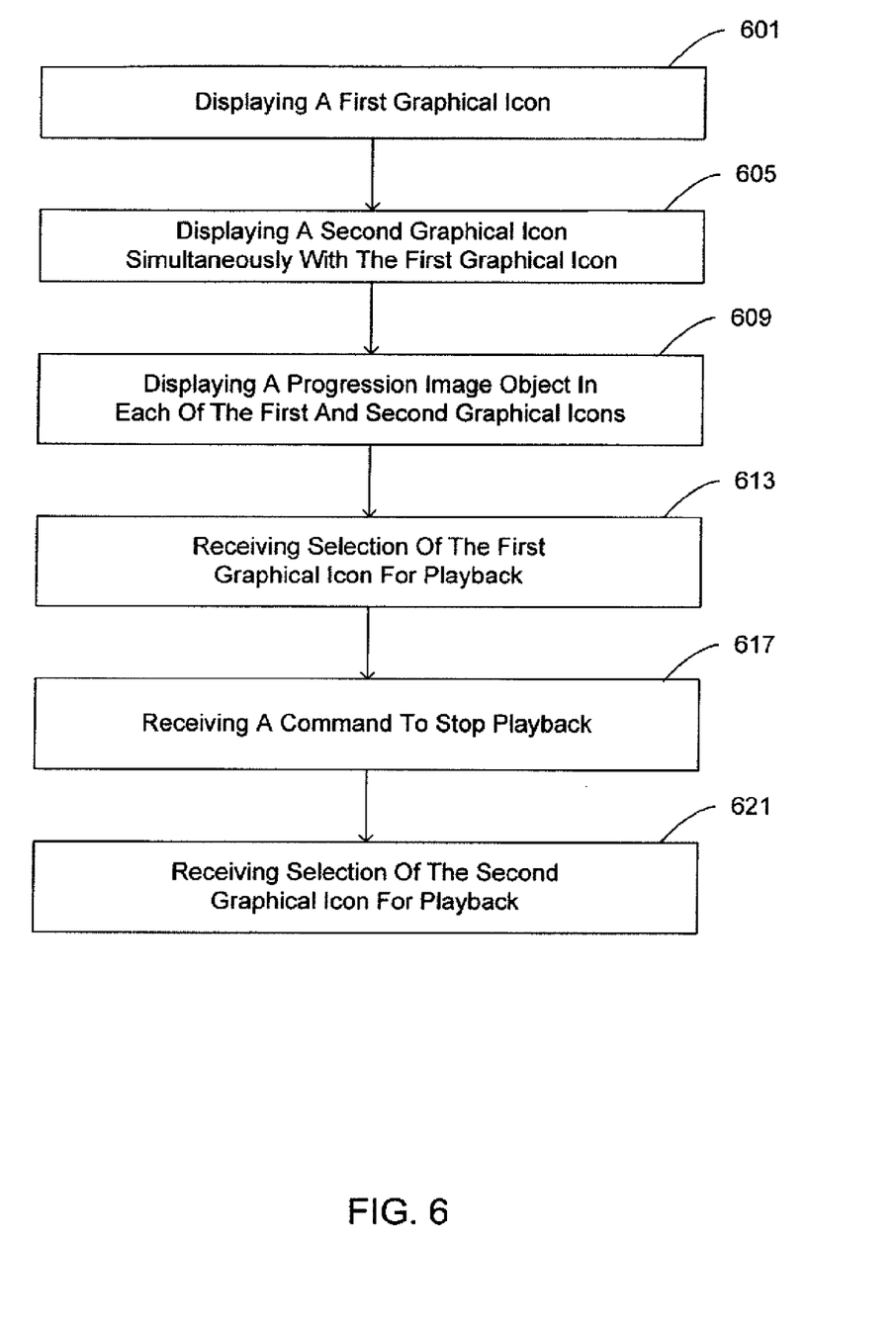
FIG. 6 illustrates an embodiment of a method for executing a graphics user interface, such as the graphics user interface of FIG. 3 and/or FIG. 4.

FIG. 6 shows a method for executing a graphics user interface, such as the graphics user interface 300 and/or 401. Fewer or more acts may be provided. In act 601, a first graphical icon, such as a graphical representation 304 or 405, is displayed. For example, the second user may turn on his or her computer, phone, PDA, or other user device and view a voicemail inbox, song or music selection screen, and/or graphics user interface screen or window identifying audio content. The window displays an icon identifying a voice message, a song, or other audio files.

In act 605, a second graphical icon, such as another graphical representation 304 or 405, is displayed simultaneously with the first graphical icon. The second graphical icon identifies a separate or other voice message, song, or other audio data. The second and first graphical icons are arranged in a list format. For example, the first and second graphical icons are displayed in the same window or screen. The second user may scroll up and down within the screen to view multiple icons identifying different voice messages, songs, or other audio files.

In act 609, a progression image object, such as the progression icon 308 or 403, is displayed in each of the first and second graphical icons. The progression image objects are always displayed or displayed when playback of a selected audio file is initiated or when a user stops, pauses, or selects a point in time after a zero time or origin point within a respective graphical icon.

In act 613, selection of the first graphical icon is received for playback of the respective voice message, song, or other audio file. For example, the second user decides to listen to the voice message or audio content corresponding to the first graphical icon. The first graphical icon includes an activation button, such as the activation button 433, and the second user selects the activation button for playback. Alternatively, the progression image object may be selected or "clicked on" to initiate playback. Based on the selection, the user device requests the stored voice message, song, or audio content from the database or server in the network, and the database or server transmits the voice message, song, or audio file to the user device in response to the query. The user device outputs audio signals to play the audio content. While play back is occurring, the respective progression icon or image object moves across the first graphical icon to track the temporal location of the audio playback, and other progression icons or image objects are either not visually present or remain at rest at certain temporal locations. The audio signals may be outputted by speakers in or on the user device or by another device in communication with the user device. Alternatively, the voice message, song, or audio content is stored on or in the user device, and requesting the voice message, song, or audio content from the network may be avoided.

In act 617, a command to stop playback is received. For example, a user selects or "clicks on" the activation/soft button or progression icon to stop or pause playback of the audio content. The respective progression image object or icons rests or stops at a position corresponding to a time at which the selected audio content is stopped. In act 621, selection of the second graphical icon is received for playback of the respective voice message, song, or other audio file, similar to the selection of the first graphical icon. While play back of the audio content regarding the second graphical icon is occurring, the respective progression icon moves across the second graphical icon to track the temporal location of the audio playback.

The logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A tangible computer-readable storage medium including instructions that when executed implement a graphics user interface on a display, the instructions comprising:
    a plurality of graphical representations identifying separate voice messages, respectively, each of the plurality of graphical representations configured in a list to be selected for playback of the respective voice messages;
    a first progression icon displayed in a first graphical representation of the plurality of graphical representations and configured to illustrate a temporal progression of the playback of the voice message of the first graphical representation; and
    a second progression icon displayed in a second graphical representation of the plurality of graphical representations and configured to illustrate a temporal progression of the playback of the voice message of the second graphical representation;
    wherein the first progression icon is displayed after an origin state of the playback of the voice message of the first graphical representation and during the playback of the voice message of the second graphical representation and displayed simultaneously on the display with the second progression icon.

2. The tangible computer-readable storage medium of claim 1, wherein the first progression icon extends over an entire height of the first graphical representation.

3. The tangible computer-readable storage medium of claim 1, wherein each of the graphical representations illustrates a time corresponding to the respective voice message.

4. The tangible computer-readable storage medium of claim 1, wherein each of the graphical representations illustrates a phone number corresponding to the respective voice message.

5. The tangible computer-readable storage medium of claim 1, wherein the plurality of graphical representations are displayed on a screen of a user device.

6. The tangible computer-readable storage medium of claim 5, wherein the user device comprises a telephone, a computer, or a personal digital assistant.

7. The graphics user interface of claim 1, further comprising:
    a first subject field including a summary of the first voice message; and
    a second subject field including a summary of the second voice message, wherein the first subject field and the second subject field are displayed simultaneously.

8. A method comprising:
    receiving a plurality of data signals;
    storing, in a memory, the plurality of data signals as audio voice message files;
    generating a plurality of image objects, each image object identifying a respective audio voice message file; and
    generating a progression icon to be displayed in each image object simultaneously, the progression icons extending over an entire height of the image objects, wherein movement of the progression icon during playback of the audio voice message file corresponds to temporal progression of the audio voice message file, wherein the progression icon remains at a corresponding temporal location when playback of the audio voice message file is stopped and another audio voice message file is selected.

9. The method of claim 8, wherein movement of the progression icon comprises movement of a graphical bar across the image object.

10. The method of claim 8, wherein a portion of the image object changes color or shade as the progression icon moves across the portion.

11. The method of claim 8, wherein the image object illustrates a name and subject corresponding to the audio voice message file.

12. The method of claim 8, further comprising:
    displaying simultaneously a subject field including text generalized from the respective audio voice message file of each image object.

13. The method of claim 8, wherein the first progression icon and the second graphical representation are adjacent and share a border.

14. A method comprising:
    displaying a first graphical icon;
    displaying a second graphical icon simultaneously with the first graphical icon, wherein the first graphical icon represents a first voice message and the second graphical icon represents a second voice message;
    receiving selection of the first graphical icon for playback of the first voice message;
    receiving selection of the second graphical icon for playback of the second voice message;
    displaying a first progression image object in the first graphical icon and a second progression image object in the second graphical icon, wherein the first progression image object and the second progression image object are displayed simultaneously at locations illustrating a temporal position of a current audio playback in both the first voice message and the second voice message after an initial state.

15. The method of claim 14, wherein the first graphical icon and the second graphical icon are displayed in a list format in a same window.

16. The method of claim 15, wherein the first progression image object of the selected first graphical icon moves during playback while the second progression image object of the second graphical icon remains at rest.

17. The method of claim 14, wherein the first graphical icon and the second graphical icon are displayed in a chronological order.

18. The method of claim 14, further comprising:
    receiving a command to stop playback of the first voice message, wherein the first progression image object rests at a position corresponding to a time at which the first voice message is stopped.

19. The method of claim 14, further comprising:
   displaying simultaneously a first subject field including a summary of the first voice message and a second subject field including a summary of the second voice message.

\* \* \* \* \*